United States Patent [19]

Hermanns et al.

[11] 4,408,659

[45] Oct. 11, 1983

[54] HEAT STORAGE MASS FOR REGENERATIVE HEAT EXCHANGE

[75] Inventors: Bernd Hermanns; Stanislaw Michalak, both of Reichshof, Fed. Rep. of Germany

[73] Assignee: L. & C. Steinmüller GmbH, Gummersbach, Fed. Rep. of Germany

[21] Appl. No.: 311,046

[22] Filed: Oct. 13, 1981

[30] Foreign Application Priority Data

Oct. 14, 1980 [DE] Fed. Rep. of Germany ....... 3038723

[51] Int. Cl.³ .......................................... F28D 19/00
[52] U.S. Cl. .............................. 165/10; 165/104.16; 165/104.11
[58] Field of Search ..................... 165/10, 53, 104.16, 165/104.11

[56] References Cited

U.S. PATENT DOCUMENTS 4,003,426 1/1977 Best et al. ........................ 165/53 X
4,259,401 3/1981 Chahroudi ....................... 165/10 X

FOREIGN PATENT DOCUMENTS 2854880 6/1979 Fed. Rep. of Germany ... 165/10 A

*Primary Examiner*—Albert W. Davis, Jr.
*Attorney, Agent, or Firm*—Becker & Becker, Inc.

[57] ABSTRACT

A heat storage mass or heat retainer made of at least two different materials, with the heat storage capacity of the entire mass being based predominantly upon the heat storage capacity of a first material, which is embedded in hollow spaces or chambers, or pores, which are uniformly or statistically distributed in a second carrier material.

2 Claims, 9 Drawing Figures

HEAT STORAGE MASS FOR REGENERATIVE HEAT EXCHANGE

The present invention relates to a heat retainer or storage mass for regenerative heat exchange between fluid media.

The previously known heat storage or heat transfer masses for regenerators are predominantly homogeneous or microheterogeneous solid materials. Metals, alloys thereof, ceramic masses, and sintered materials are used as materials for such heat storage or heat transfer masses. In view of the physical, chemical, and technical processing properties which are essential for heat storage or heat retaining masses, including specific heat capacity, thermal conductivity, resistance to temperature and temperature changes, corrosion resistance, chemical inertness or passivity, and problem-free cleaning possibilities, critical compromises must frequently be made with the heretofore known masses.

Accordingly, these known masses have a relatively low heat capacity, so that high capacities require the utilization of larger masses. Basically, to increase the heat capacity, it is possible to surround materials having a high heat storage or retaining capacity with materials of the aforementioned type, as is known for instance with the so-called latent heat storage masses. However, the heat transfer is considerably impaired when paraffins, salt hydrates, etc., are used because of the poor heat conductivity of these materials. A complicated technology, associated with high apparatus cost, is required when utilizing the heat of fusion of metals, such as sodium.

Corrosion problems frequently result with heat retainers on a metal base; if for this reason coated, e.g. enameled, metals, or ceramic materials, are avoided, one must accept the disadvantage of a lower heat conductivity. The known masses are frequently prone to the formation of incrustations, for instance during utilization in dust-laden and corrosive gases, especially in the vicinity of or upon exceeding the dew point; such incrustations can have considerable influence upon the effectiveness and also the life of the heat retainer.

It is therefore an object of the present invention to provide a heat-transferring retainer or storage mass which has a higher heat capacity and a higher corrosion resistance than the heretofore known masses, and which is capable of being cleaned without great apparatus costs because of its surface characteristics, so that a problem-free and intensive heat exchange is possible.

This object is inventively realized in that the heat retainer or storage mass is made of at least two different materials, whereby these materials, because of their different properties, respectively contribute to optimizing the different characteristics of the heat storage masses.

The above object, and other objects and advantages of the present invention, will appear more clearly from the following specification in connection with the accompanying drawings, in which.

In accordance with the present invention, the material 1 of the storage mass or retainer is a substance, or a mixture of substances, which has a high heat capacity, and/or which experiences one or more phase changes in the temperature range of interest, and/or with which a reversible chemical reaction occurs. The carrier material 2, in contrast, serves as a support and carrier substance, and is selected with a view toward optimum mechanical properties, corrosion resistance, thermal conductivity, and surface characteristics. One or more of these properties can be further improved by respectively embedding one or more further materials.

The spatial build-up of the heat retainer or heat storage mass, which comprises the storage material 1 and the carrier material 2, is of critical importance for realizing the object of the present invention. The carrier material 2 inventively has, for instance, a cellular plastic or honeycombed structure, i.e., the carrier material surrounds a large number of distinct hollow chambers, or also hollow chambers which communicate with one another. These hollow spaces or chambers are filled entirely or partially with the predominantly heat-storing material 1. In the case of a spongy structure, the hollow spaces or chambers are sealed or closed off outwardly by a coating of the carrier material 2 or a different material. If a latent storage material is selected for instance as the heat retaining or storing material 1, and the inventive heat retainer or storage mass is installed in the rotor of a Ljungstrom heat exchanger, certain substantial advantages are obtained over the present state of the art. On the one hand, the mass of the rotor is considerably reduced while the heat transfer capacity remains constant (see the subsequent example), and on the other hand the latent storage material provides a nearly constant temperature level in the entire heat exchanger. Thus, the heat expansion effects which occur because of the customarily arising temperature fluctuations, and the sealing problems resulting therefrom, are extensively avoided.

EXAMPLE

The following example provides a comparison of a conventional rotary heat exchanger of steel with a rotary heat exchanger with two types of heat retainers or storage masses in accordance with the present invention.

Design Data:

Gas Flow: $V = 950,000 \text{ m}^3/\text{h}$ (moist in standard state)

Hot Gas Temperature, Inlet: $t_{H1} = 130°$ C.

$\Delta t = 37°$ C.

Hot Gas Temperature, Outlet: $t_{H2} = 93°$ C.
Cold Gas Temperature, Inlet: $t_{K1} = 43°$ C.

$\Delta t = 37°$ C.

Figure 1A:
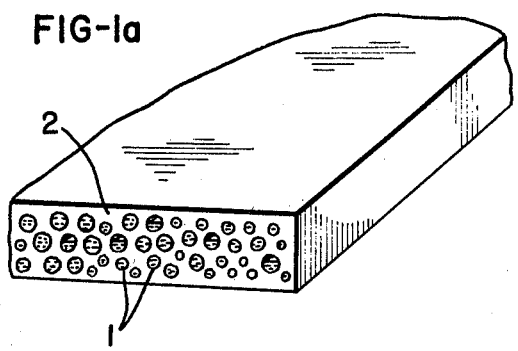
FIGS. 1a and 1b show two different forms of possible embodiments of the inventive heat retainer, with the differently shaped hollow chambers being provided in carrier material and being filled with storage material.
Figure 1B:
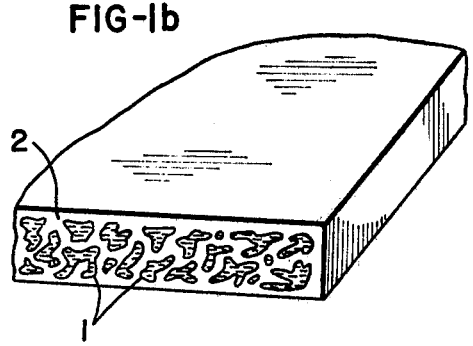
Figure 2:
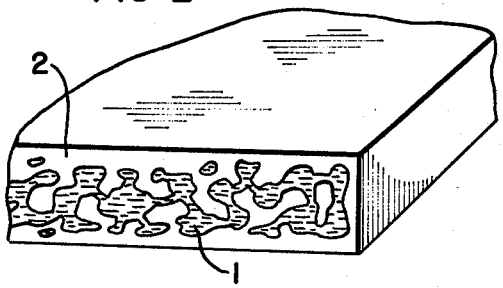
FIG. 2 shows a cellular plastic arrangement of the hollow chambers, which at least partially are connected with each other.
Figure 3A:
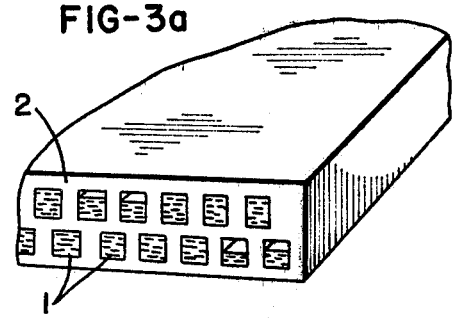
FIGS. 3a and 3b show examples of possible uniform structures of the heat retainers or heat storage masses.
Figure 3B:
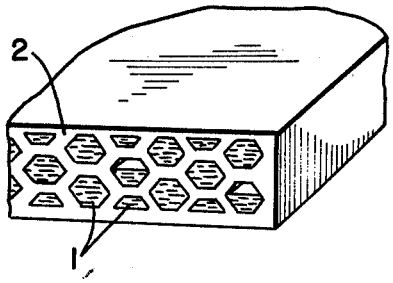
Figure 5:
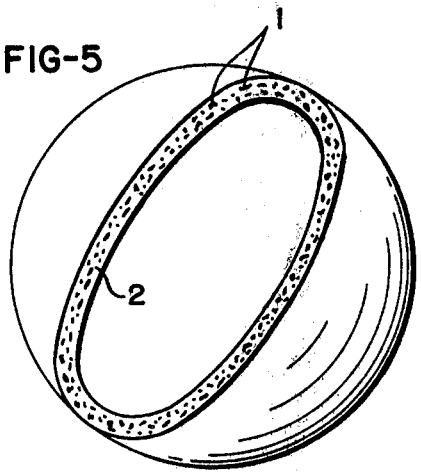
FIG. 5 shows another embodiment of the heat retainer as a hollow sphere for a fluidized bed heat exchanger.
Figure 4:
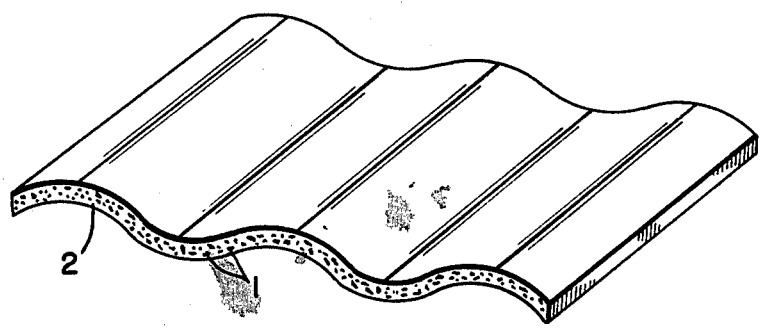
FIG. 4 shows one embodiment of the heat retainer as a wavy plate, for example for installation in a Ljungstrom heat exchanger.
Figure 6:
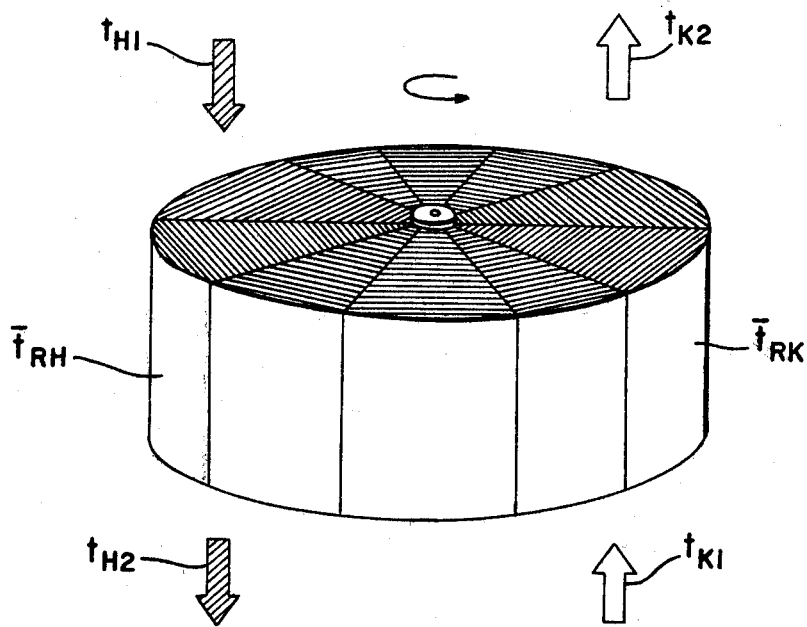
FIGS. 6 and 7 show heat exchanger rotors in which inventive heat retainers are placed.
Figure 7:
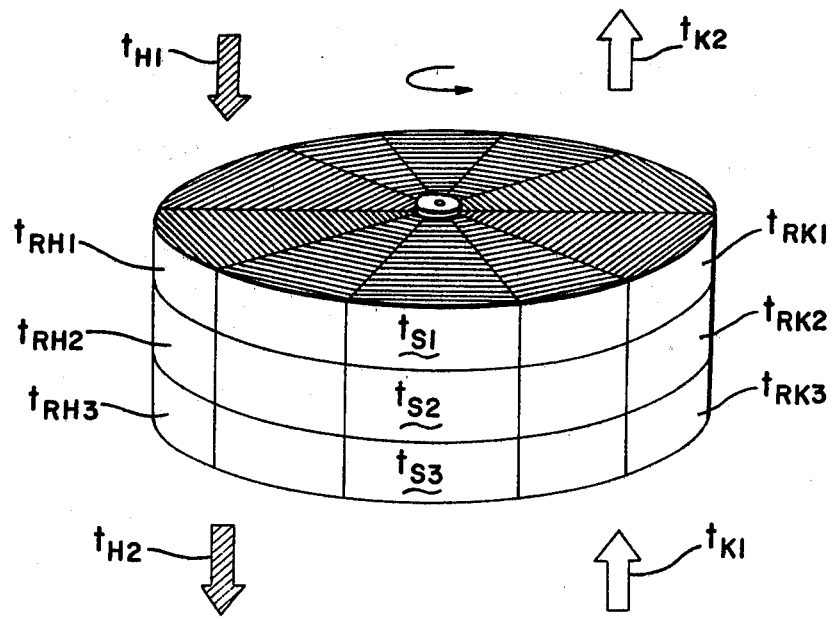

Cold Gas Temperature, Outlet: $t_{K2} = 80°$ C.
Density of the Gas: $\rho = 1.3 \text{ kg/m}^3$ (moist in standard state)
Specific Heat of the Gas: $C_p = 1 \text{ kJ/kg}$
Heat Flow: $Q = V \cdot \rho \cdot C_p \cdot \Delta t = 45{,}695 \text{ MJ/h}$ -continued Design Data:

Rotational Speed of the Rotor: n = 1.5 rpm
(a) Rotor Storage Mass of Steel
Mean Temperature Difference of the Rotor between Hot Gas
Side and Cold Gas Side: $\Delta t_R = t_{RH} = t_{RK} = 10°$ C.
(see FIG. 6)
Specific Heat of Steel: 0.5 kJ/kg · K Mass of the Rotor: $m_1 = \dfrac{\Delta Q}{60 \cdot n \cdot C_p \cdot \Delta T_R}$ 101,544 kg (b) Rotor Storage Mass of an inventive Heat Retainer
or Storage Mass comprising 40% by weight of
a fluoro-synthetic material (material 2), and 60%
by weight of a liquid (material 1).
Mean Temperature Difference of the Rotor between
Hot Gas Side and Cold Gas Side $T_R = 10°$ C. (see FIG. 6).
Specific Heat of the Synthetic Material: $C_{pk} = 1.1$ kJ/kg · K
Specific Heat of the Liquid: $C_{pF} = 2.2$ kJ/kg · K
Mean Specific Heat of the Entire Mass:
$\overline{C}_p = 0.4 \cdot C_{pK} + 0.6 \cdot C_{pF} = 1.76$ kJ/kg · K Mass of the Rotor: $m_2 = \dfrac{\Delta Q}{60 \cdot n \cdot \overline{C}_p \cdot \Delta t_R} = 28{,}848$ kg (c) Rotor Storage Mass of an inventive Heat Retainer or
Storage Mass comprising 40% by weight of a fluoro-
synthetic material (material 2), and 60% by weight of
a latent storage mass (material 1).
For the latent storage mass, a phase transition
solid-liquid with a specific heat of fusion of
$\Delta H_S = 200$ kJ/kg is assumed.
In three different planes or levels of the rotor,
different latent storage masses with different melting
temperatures are used.
$t_{S1} = 105°$ C., $t_{S2} = 86°$ C., $t_{S3} = 68°$ C.
Mean temperature difference of the rotor between
hot gas side and cold gas side:
$\Delta t_r = t_{RH1} - t_{RK1} = t_{RH2} - t_{RK2} = t_{RH3} - t_{RK3} = 1°$ C.
(see FIG. 7)
Only the heat storage or retention by means of the
phase transition of the storage material 1 is taken
into account. For this purpose, it is presumed that
only 80% of this material solidifies or melts; $\eta_s = 0.8$ Mass of the rotor: $0.6 \cdot m_3 = \dfrac{\Delta Q}{n \cdot \Delta H_S \cdot \eta_s \cdot 60} = 3173$ kg $m_3 = 5289$ kg
The above calculations show that by utilizing the
inventive heat retention or storage mass, a considerable
mass reduction for the rotor of a rotary heat exchanger
can be attained. A further special advantage resulting
with a utilization according to example (c) (FIG. 7)
is the low mean temperature difference of approximately
1° C. between the hot gas side and the cold gas side.
The higher temperature difference resulting therefrom
between the gas and the rotor storage mass makes it
possible, at a constant capacity, to obtain a sig-
nificant reduction of the necessary exchanger surface,
since the necessary surface F at constant heat flow is
inversely proportional to the temperature difference.
An increase of the temperature difference between the
gas and the rotor storage mass of 20° C. to 25° C. there- -continued Design Data:

fore reduces the necessary surface by 20%.

In summary, the present invention provides a heat retainer or storage mass of at least two different materials, with the heat storage capacity of the entire mass being based predominantly upon the heat storage capacity of the material 1, which is embedded in uniformly or statistically or randomly distributed hollow chambers or spaces, or pores, of the carrier or support material 2. The carrier material 2 may comprise a high-temperature-resistant or refractory material, such as a ceramic mass or a sintered material. The carrier material 2 may also comprise a coated or uncoated metal or an alloy. The carrier material 2 may also comprise synthetic material in which, to increase the thermal conductivity and/or to improve the mechanical and thermal stability, there are embedded or impregnated metal and/or graphite and/or some other suitable material.

The hollow chambers or spaces or the pores surrounded by the carrier material 2 are filled entirely or partially with a heat storage material 1, the heat storage capacity of which, among other factors, is based upon a phase change and/or a chemical reaction. The heat storage material 1 may comprise a mixture of several components. The hollow spaces or chambers contained in the carrier or support material 2 may also be filled entirely or partially with different heat storage materials ($1a$, $1b$, $1c$ . . . ).

The heat storage mass may be utilized for heat transfer in the form of entirely or partially filled or unfilled hollow bodies, whereby the filling can comprise not only the material 1, but also a different material. The heat storage mass may also be utilized for heat transfer in the form of pieces or individual elements, for instance as balls, cylinders, ellipsoids, or the like.

The present invention is, of course, in no way restricted to the specific disclosure of the specification, example, and drawings, but also encompasses any modifications within the scope of the appended claims.

What we claim is:

1. A regenerative heat exchanger for cooling hot gas streams and heating cool gas streams with heat extracted from the hot gas streams, the heat exchanger comprising: a fluidized bed through which both the cool and hot gases pass, the fluidized bed including a plurality of individual elements, wherein each element comprises a hollow body having a wall comprising a carrier material having a relatively high thermal conductivity and resistance to destruction by the gases, the wall having a plurality of spaces therein, and a material of high heat storage capacity sealed within the spaces.

2. The regenerative heat exchanger of claim 1 wherein the individual elements are spherical in shape.

* * * * *